United States Patent [19]

Räsänen

[11] Patent Number: 5,966,374
[45] Date of Patent: Oct. 12, 1999

[54] HIGH-SPEED DATA TRANSMISSION IN MOBILE COMMUNICATION NETWORKS

[75] Inventor: Juha Räsänen, Espoo, Finland

[73] Assignee: Nokia Telecommunications OY, Espoo, Finland

[21] Appl. No.: 08/860,426

[22] PCT Filed: Dec. 8, 1995

[86] PCT No.: PCT/FI95/00673

§ 371 Date: Jun. 9, 1997

§ 102(e) Date: Jun. 9, 1997

[87] PCT Pub. No.: WO96/18248

PCT Pub. Date: Jun. 13, 1996

[30] Foreign Application Priority Data

Dec. 9, 1994 [FI] Finland ................................ 945817

[51] Int. Cl.⁶ .............................. H04Q 7/22; H04B 7/212
[52] U.S. Cl. ........................................... 370/337; 370/468
[58] Field of Search ................................. 370/321, 326, 370/329, 337, 345, 347, 465, 468, 473, 474, 394

[56] References Cited

U.S. PATENT DOCUMENTS

| | | | |
|---|---|---|---|
| 4,805,167 | 2/1989 | Leslie et al. ............................ | 370/476 |
| 4,905,226 | 2/1990 | Kobayashi ............................. | 370/458 |
| 5,124,985 | 6/1992 | Hoshikawa ............................ | 370/347 |
| 5,260,989 | 11/1993 | Jenness et al. ......................... | 370/329 |
| 5,278,827 | 1/1994 | Pound .................................... | 370/84 |
| 5,335,225 | 8/1994 | Brax ...................................... | 370/465 |
| 5,440,542 | 8/1995 | Procter et al. .......................... | 370/18 |
| 5,583,851 | 12/1996 | Kato et al. ............................. | 370/342 |
| 5,583,859 | 12/1996 | Feldmeier .............................. | 370/471 |
| 5,689,503 | 11/1997 | Wada et al. ............................ | 370/337 |

FOREIGN PATENT DOCUMENTS

| | | |
|---|---|---|
| 587 980 | 3/1994 | European Pat. Off. . |
| 614 323 | 9/1994 | European Pat. Off. . |
| 615 393 | 9/1994 | European Pat. Off. . |
| 91/14319 | 9/1991 | WIPO . |
| 95/31878 | 11/1995 | WIPO . |

OTHER PUBLICATIONS

Michel Mouly, Marie–Bernadette Pautet, "The GSM System for Mobile Communications", Copyright 1992, pp. 216;232–234, 249–259.

European Digital Cellular Telecommunications System (Phase 2);Multiplexing and Multiple Access on the Radio Path (GSM 05.02) ETS 300574, UDC: 621.396.21, Sep. 1994, pp. 2–36.

*Primary Examiner*—Chau Nguyen
*Assistant Examiner*—Phuong-Chau Ba Nguyen
*Attorney, Agent, or Firm*—IP Group of Pillsbury Madison & Sutro LLP

[57] ABSTRACT

In a mobile communication system, two or more parallel traffic channels are allocated for high-speed data transmission over the radio path. Different channel numbers are assigned to these parallel traffic channels for the duration of the connection. The data of a high-speed data signal is inserted at the distribution point of the transmission end into frames each of which is provided with a channel number indicating the parallel traffic channel used for the transmission. The frames transmitted in a traffic channel always contain the same channel number during the whole call. The frames are divided into parallel traffic channel in the sequential order according to the channel numbering. At the reception end the data contained in the frames is reassembled into a high-speed data signal in the sequential order according to the channel numbers in the frames. Frame numbering may be used within each of the traffic channels so that at least two successive frames always have a different frame number. Consequently, the allowed delay offset between the traffic channels will increase with the number of the frame numbers, and the order of the frames will be maintained under any circumstances.

9 Claims, 3 Drawing Sheets

| OCTET NO. | BIT NUMBER | | | | | | | |
|---|---|---|---|---|---|---|---|---|
| | 1 | 2 | 3 | 4 | 5 | 6 | 7 | 8 |
| 0 | 0 | 0 | 0 | 0 | 0 | 0 | 0 | 0 |
| 1 | 1 | D1 | D2 | D3 | D4 | D5 | D6 | S1 |
| 2 | 1 | D7 | D8 | D9 | D10 | D11 | D12 | X |
| 3 | 1 | D13 | D14 | D15 | D16 | D17 | D18 | S3 |
| 4 | 1 | D19 | D20 | D21 | D22 | D23 | D24 | S4 |
| 5 | 1 | E1 | E2 | E3 | E4 | E5 | E6 | E7 |
| 6 | 1 | D25 | D26 | D27 | D28 | D29 | D30 | S6 |
| 7 | 1 | D31 | D32 | D33 | D34 | D35 | D36 | X |
| 8 | 1 | D37 | D38 | D39 | D40 | D41 | D42 | S8 |
| 9 | 1 | D43 | D44 | D45 | D46 | D47 | D48 | S9 |

HIGH-SPEED DATA TRANSMISSION IN MOBILE COMMUNICATION NETWORKS

FIELD OF THE INVENTION

The invention relates to high-speed data transmission in digital mobile communication networks.

BACKGROUND

In radio telecommunication systems of the time division multiple access type (TDMA) the communication on the radio path is carried out time-divisionally in successive TDMA frames each of which consists of several time slots. A short information packet is transmitted in each time slot as a radio frequency burst having a finite duration and consisting of a group of modulated bits. Time slots are mainly used for carrying control channels and traffic channels. Speech and data are transmitted on traffic channels. Signalling between a base station and mobile subscriber stations is carried out on the control channels. One example of a TDMA radio system is a pan-European mobile communication system GSM (Global System for Mobile Communications).

In traditional TDMA systems each mobile station is allocated a single traffic channel time slot for data or speech transmission. Thus in the GSM system, for example, a common carrier wave can carry up to eight parallel connections to different mobile stations. The maximum data transfer rate on one traffic channel is limited to a relatively low value according to the available bandwidth and channel coding and error correction used in the transmission, e.g. 9.6 kbit/s or 12 kbit/s in the GSM system. In the GSM system a half-rate (max. 4.8 kbit/s) traffic channel can also be selected for low speech coding rates. A half-rate traffic channel is established when a mobile station operates in a specific time slot only in every second frame, that is, at half rate. Another mobile station operates in every second frame in the same time slot. Thus in terms of the number of subscribers, the capacity of the system can be doubled, that is, as many as 16 mobile stations can operate on the same carrier at the same time.

In recent years the need for high-speed data services has grown significantly. For example, transmission rates s of 64 kbit/s or higher would be needed for utilizing the circuit switched digital data services of the ISDN (Integrated Services Digital Network). Higher transmission rates, such as 14.4 kbit/s, are needed for data services of the public switched telephone network PSTN, such as modem and class G3 telefaxes. Mobile video service is one area of growth in mobile data transmission that requires higher transmission rates than 9.6 kbit/s. Security surveillance by cameras and video databases are examples of these services. The minimum data rate in video transmission may be 16 or 32 kbit/s, for example.

The transmission rates of present mobile communication networks are not, however, sufficient for satisfying these new requirements.

One solution, disclosed in Applicant's co-pending Finnish Patent Application 942,190, which was unpublished at the filing date of the present application, is to allocate to one high-speed data transmission two or more parallel traffic channels on the radio path. A high-speed data signal is divided into these parallel traffic channels at the transmission end for the transmission over the radio path and it is reassembled at the reception end. Thus data transmission services are provided in which, depending on the number of the allocated traffic channels, the transmission rate may be up to eight times higher in comparison with the standard transmission rate. For example, in the GSM system two parallel traffic channels provide a transmission rate of 2×9.6 kbit/s which is sufficient for a modem or a telefax of 14.4 kbit/s. Six parallel traffic channels will enable a transmission rate of 64 kbit/s.

In using parallel traffic channels the problem is how to divide the data flow between parallel transparent traffic channels and how to synchronize the reassembling of data received from the parallel traffic channels.

SUMMARY OF THE INVENTION

The object of the present invention is to eliminate this problem.

This object is achieved with a method for a high-speed data transmission in a digital mobile communication system in which method data is transmitted over the radio path between a mobile station and a fixed mobile communication network in a traffic channel allocated to the mobile station. The method is according to the invention characterized by allocating a high-speed data signal at least two parallel traffic channels having mutually different channel numbers assigned for the duration of a connection, when the data transmission rate required by the data signal exceeds a maximum transmission rate of one traffic channel, inserting the data from the high-speed data signal into frames at the transmission end, each frame being provided with the channel number indicating the parallel traffic channel used for the transmission, dividing the frames into parallel traffic channels in the sequential order according to channel numbering and transmitting them to the reception end, reassembling the data in the frames into a high-speed data signal in the sequential order indicated by the channel numbers in the frames at the reception end.

The invention also relates to a digital mobile communication system in which a mobile station and a fixed mobile communication network each comprise a data transmitter and a data receiver having a capability for a data transmission over the radio path on the traffic channel allocated to the mobile station. The system is according to the invention characterized in that the fixed mobile communication network is arranged to allocate to a high-speed data signal two or more parallel traffic channels having mutually different channel numbers during the connection, when the transmission rate required by the data signal is higher than the maximum transmission rate of one traffic channel, the data transmitters are arranged to insert the data from the high-speed data signal into frames, each frame being provided with a channel number indicating the parallel traffic channel used for the transmission, and to divide the frames into the parallel traffic channels in the sequential order according to channel numbering, the data receivers are arranged to reassemble the data in the frames into a high-speed data signal in the sequential order indicated by the channel numbers in the frames.

In the invention different channel numbers are assigned to the parallel traffic channels for the duration of the connection. The data from a high-speed data signal is inserted into frames at the distribution point of the transmission end, each of the frames being assigned a channel number indicating the parallel traffic channel used for the transmission. The frames transmitted on a specific traffic channel will always contain the same channel number during the whole call. The frames are divided into parallel traffic channels in the sequential order according to channel numbering, the first frame into the first channel, the second frame into the second channel, etc. and are transmitted to the assembly point of the reception end in which the data in the frames is re-assembled into a high-speed data signal in the sequential order according to the channel numbers in the frames.

The length of the frame determines the maximum value for the relative transmission delays between parallel traffic channels which can be tolerated without losing the order of the frames at the reception. In order that the tolerable delay offset would be longer, the present invention employs frame numbering within each of the traffic channels so that at least two successive frames always have a different frame number. Then the allowed delay offset between the traffic channels will increase in proportion to the number of frame numbers, it will be at least doubled, and the order of the frames can be retained under any circumstances. If two frame numbers are used, e.g. 1-bit numbering 0 and 1, the frames of the traffic channel are numbered at the transmission end in the following way: 0, 1, 0, 1, 0, 1, . . . If four frame numbers are used, e.g. 2-bit numbering, the frames of the traffic channel are numbered at the transmission end in the following way: 0, 1, 2, 3, 0, 1, 2, 3, . . . Then in the case of eight parallel traffic channels, for example, the first eight frames are transmitted with frame number 0, one frame in each traffic channel, the subsequent eight frames are transmitted with frame number 1, etc. The high-speed data signal is reassembled at the reception end by using the channel and frame numbers contained in the frames.

In the preferred embodiment of the invention the frames are frames in compliance with CCITT recommendation V.110. In V.110 frames status bits are transferred to carry channel control information for synchronization when entering and leaving a data transmission mode as well as for a transparent transmission of status data between data transmission equipments during the data transmission mode. In accordance with the recommendation, each status data is transmitted as replicated in two or four status bits inside the V.110 frame and the change of the status state is confirmed only if the same state is in every bit. In this way, the effect of short inferences is filtered from the transmission of statuses. As in the present invention the same status data is transmitted through several parallel traffic channels in the data transmission mode, there are "extra" redundant status bits in the frames of each traffic channel, the omission of which does not have any effect on the number of the replicated status bits, nor on the bit error rate of the status signals. For example, in the case of two parallel channels, a double number of status bits will be transferred, half of which are therefore redundant. In the preferred embodiment of the invention these redundant status bits are used for channel and frame numbering so that channel numbering is carried in each frame within the channel. At the expense of the bit error ratio, more status bits than just the redundant bits may be used for channel and frame numbering.

BRIEF DESCRIPTION OF THE DRAWING

In the following, the invention will be explained by means of primary embodiments with reference to the accompanying drawings, in which.

DETAILED DESCRIPTION OF THE PRESENTLY PREFERRED EXEMPLARY EMBODIMENTS

Figures 1, 4:
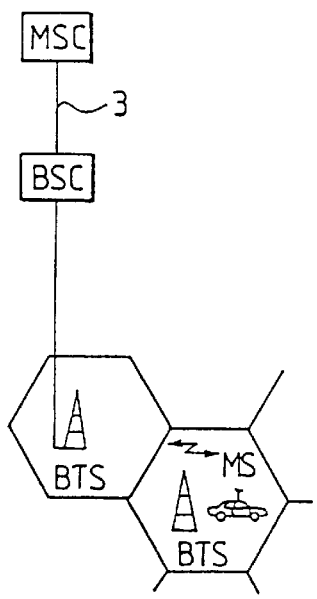
FIG. 1 illustrates a part of one mobile communication system to which the invention may be applied.
FIG. 4 shows the V.110 frame structure.

The present invention can be applied to a high-speed data transmission in digital TDMA mobile communication systems, such as the pan-European digital mobile communication system GSM, DCS1800 (Digital Communication System), a mobile communication system according to EIA/TIA Interim Standarding IS/41.3, etc. The invention will be described in the following by using a GSM system type of mobile communication system as an example without restricting thereto. FIG. 1 presents very briefly the basic structural parts of the GSM system, without further specifying the features and other elements of the system. With regard to a more detailed description of the GSM system, a reference is made to the GSM Specifications and to *The GSM System for Mobile Communications*, by M. Mouly & M. Pautet, Palaiseau, France, 1992, ISBN: 2-9507190-0-0-7.

A mobile services switching centre MSC attends to the switching of incoming and outgoing calls. It carries out tasks similar to those of the exchange in a public switched telephone network (PSTN). In addition, it carries out functions characteristic of only mobile telephone traffic, such as subscriber location management in cooperation with the network subscriber registers. Mobile stations MS are connected to the centre MSC by means of base station systems BSS. The base station system BSS comprises a base station controller BSC and base stations BTS. For the sake of clarity, FIG. 1 shows only one base station system in which the base station controller BSC is connected to two base stations having one mobile station MS within their coverage.

The GSM system is a time division multiple access (TDMA) system in which the operation on the radio path takes place on the time division principle in successive TDMA frames each comprising several time slots. A short information packet is transmitted in each time slot as a radio frequency burst having a finite duration and consisting of a group of modulated bits. Time slots are mainly used for carrying control channels and traffic channels. Speech and data are transmitted on traffic channels. Signalling between a base station and mobile subscriber stations is carried out on the control channels.

The channel structures used at the radio interface of the GSM system are defined more closely in ETSI/GSM Specification 05.02. In normal operation one time slot on one of the carrier frequencies is allocated to a mobile station MS as a traffic channel (single slot access) at the beginning of a call. The mobile station MS synchronizes to this time slot for transmitting and receiving radio frequency bursts. During the time remaining in the frame the MS carries out various measurements. Applicant' earlier Finnish Patent Application 942,190 discloses a process in which two or more time slots are allocated from the same TDMA frame to a mobile station MS that requires a data transmission with a higher rate than that provided by one traffic channel. With respect to closer details of this procedure, a reference is made to said patent application.

In the following the procedure is described with reference to FIG. 2 as one way to carry out high-speed data transmission based on several parallel traffic channels in a radio system. It should be noted that it is essential to the invention only that a transmission connection comprising many parallel traffic channels is established and the invention is directed to carrying out the data transmission and synchronizing over such connection.

Figure 2:
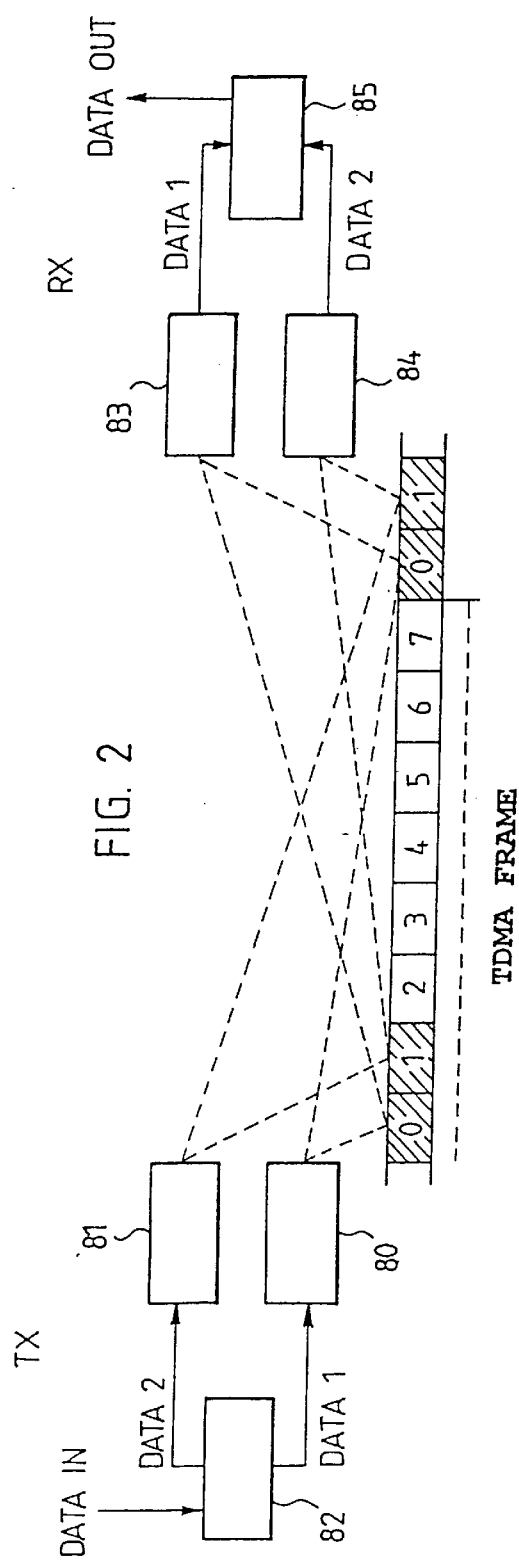
FIG. 2 illustrates a high-speed data transmission in two TDMA time slots on the radio path.

FIG. 2 shows an example in which the mobile station MS is allocated successive time slots 0 and 1 from the same TDMA frame. A high-speed data signal DATAIN that is to be transmitted over the radio path is divided in a divider 82 into the required number of slower-speed data signals DATA1 and DATA2. Channel coding, interleaving, burst building and modulation 80 and 81, respectively, are performed separately to each slower-speed data signal after which each data signal is transmitted in the form of a radio frequency burst in its dedicated time slot 0 and 1, respectively. When slower-speed data signals DATA1 and DATA2 have been transmitted separately over the radio path, demodulation, deinterleaving and channel decoding 83 and 84, respectively, are performed to them separately at the reception end after which signals DATA1 and DATA2 are combined again into the original high-speed signal DATAOUT in a combiner 85 at the reception end.

Figure 3:
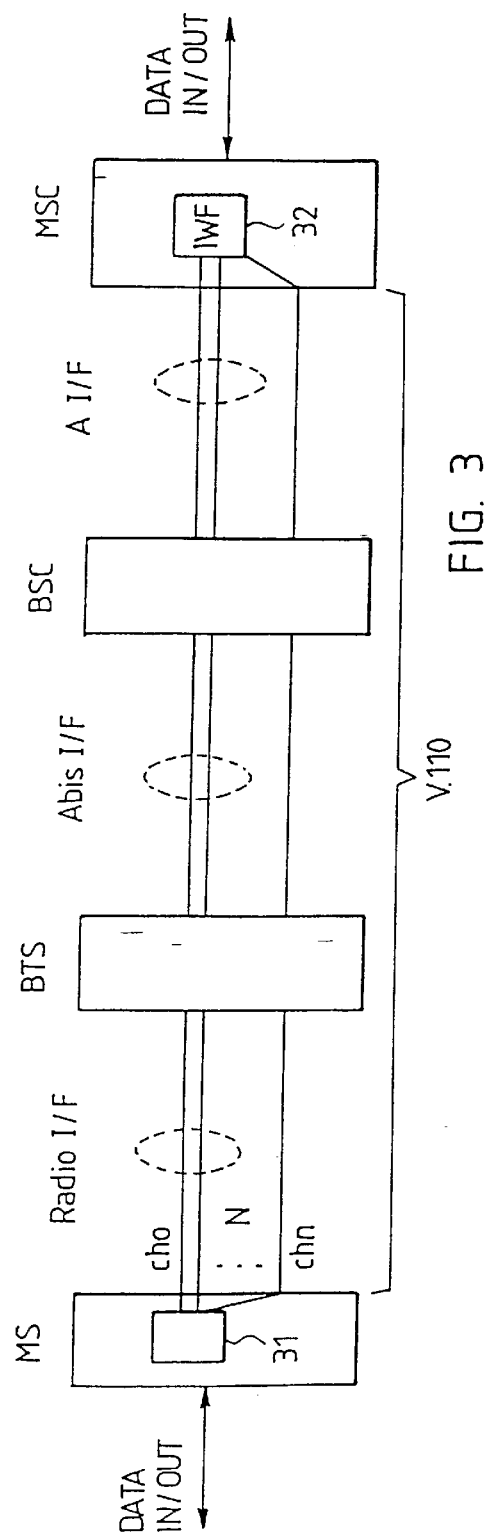
FIG. 3 illustrates the network architecture according to the invention which supports a high-speed data transmission of several traffic channels between a mobile station MS and an interworking function IWF in a GSM system.

FIG. 3 is a block diagram illustrating the architecture of the GSM network that realizes the data transmission using several parallel traffic channels. The operations of blocks 80, 81, 83 and 84 in FIG. 3, that is, channel coding, interleaving, burst building and modulation and demodulation, respectively, deinterleaving and channel decoding are situated at the fixed network preferably in the base station BTS. The TDMA frame described above is thus transmitted between the base station BTS and the mobile station MS at the radio interface Radio I/F. The base station BTS may have a separate parallel handling for each time slot. Instead, the divider 82 and the combiner 85 in FIG. 2 may be situated, as required, in a fixed network remote from the base station BTS in another network element, whereby slower-speed data signals DATA1 and DATA2 are transferred between this network element and the base station as normal signals of traffic channels. In the GSM system this transfer between the base station BTS and a special transcoder unit TRCU (Transcoder/Rateadapter unit) is carried out in TRAU frames according to ETSI/GSM Specification 08.60. Neither TRAU frames nor the transmission related thereto are essential to the invention as the invention relates to carrying out data transmission and synchronizing over the whole data connection using several parallel traffic channels, that is, between the divider 82 and the combiner 85.

In the GSM system the data connection is established between a terminal adapter 31 of the mobile station MS and an interworking function IWF 32 in the fixed network. In the data transmission of the GSM network this connection is a digital full-duplex connection that is V.110 rate adapted, adaptable to V.24 interfaces and UDI encoded. The V.110 connection described herein is a digital transmission channel developed originally for the ISDN (Integrated Services Data Network) technology, and adapted the V.24 interface and also enables the transmission of V.24 statuses (control signals). CCITT recommendation for a V.110 rate-adapted connection is specified in CCITT Blue Book: V.110. CCITT recommendation for V.24 interface is specified in CCITT Blue Book: V.24. In the following, description status signals are intended to refer to control signals of the V.24 interface, such as CT105, CT106, CT107, CT108 and CT109. A data terminal connected to the mobile station is adapted to the V.110 connection established over a physical connection using several traffic channels ch0 to chN by a terminal adapter 31. The interworking function IWF interconnects the V.110 connection to another V.110 network, such as the ISDN, or another GSM network, or another transit network, such as the public switched telephone network PSTN. In the first case the IWF only comprises the divider/combiner 82/85 according to the invention. In the last mentioned case the IWF also comprises e.g. a baseband modem with which data transmission is carried out via the PSTN.

The frame structure used in data transmission over the V.110 connection is shown in FIG. 4. A frame consists of 80 bits. Octet 0 contains binary zeros whereas octet 5 contains a binary one followed by seven E-bits. Octets 1 to 4 and 6 to 9 contain a binary one in bit location 1, a status bit (S or X bit) in bit location 8 and 6 data bits (D bits) in bit location 2 to 7. The transmission order of the bits is from left to right and from top to bottom. Thus there are 48 bits of D1 to D48 user data in the frame. Bits S and X are used for carrying channel control information relating to the data bits in the data transmission mode. Four status bits S1, S3, S6 and SB are used for carrying a CT108 status signal (Data Terminal Ready) from the mobile station MS to the interworking function IWF and transmit a CT107 status signal (Data Set Ready) from the interworking function IWF to the mobile station MS. Two status bits S4 and S9 are used for carrying a CT105 status signal (Request for Sending) from the mobile station MS to the interworking function IWF, and carry a CT109 status signal (Data Channel Received Line Signal Detector) from the interworking function IWF to the mobile station MS. Two X status bits are used for carrying a CT106 status signal (Ready for Sending) or transmission synchronization or flow control information between the adapters. In case the terminal equipments are X.21 terminals, X.21 control information is carried the S-bits. A filtering procedure is provided in the mobile station MS for receiving the CT106 and CT109 statuses and the X.21 indication.

According to the present invention, some of these control bits of the V.110 frame are reassigned so as to carry the synchronization information required for managing the data transmission over several parallel traffic channels ch0 to chN. As the CT108 and CT107 statuses, as well as the X.21 control information, can be carried in one S bit, when needed, three S bits will remain redundant. The CT105 and CT109 statuses, as well as the X.21 information, can also be carried in one S bit, whereby one more S bit will become redundant. The information carried by the X bits can be carried in one X bit, whereby the remaining X bit will become redundant. These redundant bits can be used for the numbering of the parallel traffic channels as well as for frame numbering, as will be explained below with reference to FIG. 5.

Figure 5:
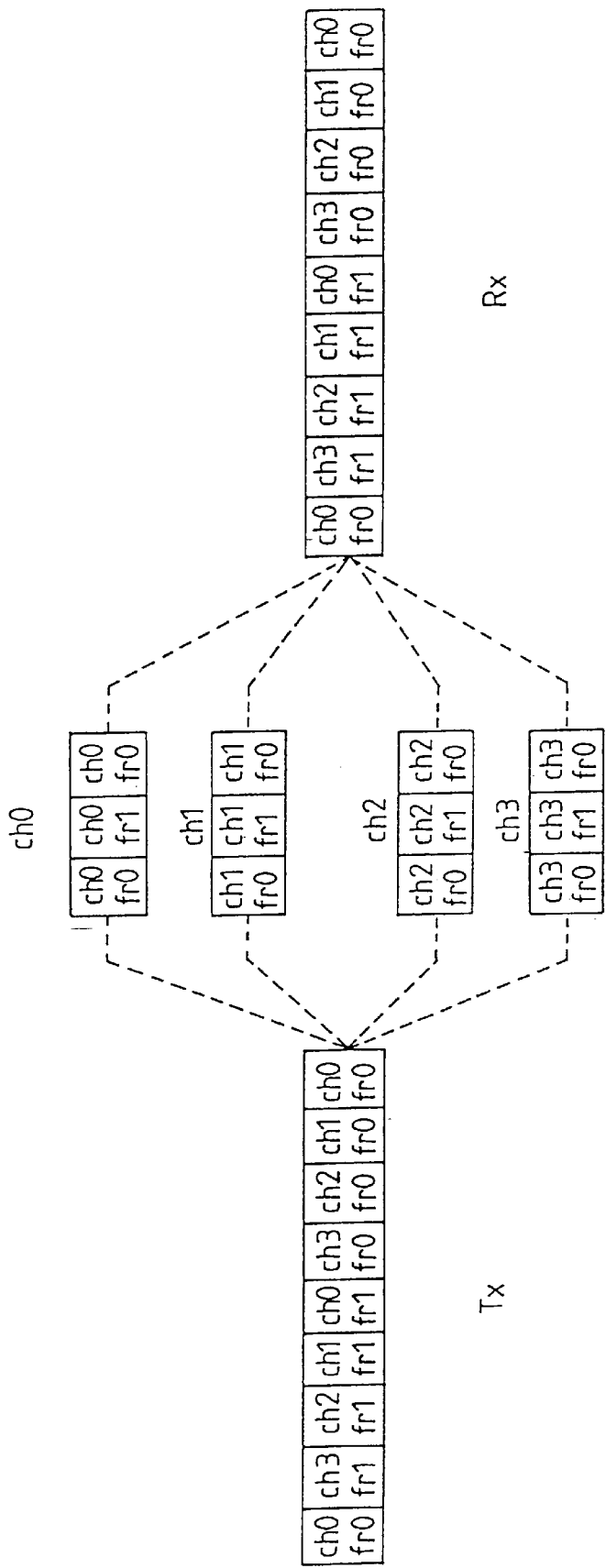
FIG. 5 illustrates the use of channel and frame numbering according to the invention for dividing the frames into several parallel traffic channels ch0 to ch3 at the transmission end Tx and for reassembling the frames at the reception end Rx.

In an example case illustrated in FIG. 5 the high-speed data transmission is carried out via four parallel traffic channels. The transmission end Tx and the reception end Rx refer to the divider 82 and the combiner 85 in the mobile station MS and in the interworking function IWF. At the beginning of a data call said four traffic channels are allocated to the data call, channel numbers ch0, ch1, ch2 and ch3 are assigned to the channels by the transmitter Tx for the duration of the call and the establishment of the connection and the synchronization of the V.110 connection are carried out for each channel separately in a manner specified in the GSM Specifications. When the transmitter Tx detects that all the traffic channels have been synchronized and entered a V.110 data transmission mode, it starts the high-speed data transmission according to the invention. The transmitter provides each frame with the channel number of the traffic channel via which the frame will be transmitted. Furthermore, the transmitter Tx uses internal frame numbering inside each frame. 1-bit frame numbering is used in FIG. 5, that is, frame numbers fr0 and fr1 are alternating in each traffic channel. As a result, the transmitter Tx divides the incoming data into successive frames in which the following channel and frame numbering are repeated in a sequence of eight frames: (ch0, fr0), (ch1, fr0), (ch2, fr0), (ch3, fr0), (ch0, fr1), (ch1, fr1), (ch2, fr1), (ch3, fr1). The transmitter Tx divides these frames into parallel channels ch0 to ch3 in the sequential order, the first frame into the first channel, the second frame into the second channel, etc. For example, in FIG. 5 the first frame (ch0, fr0) is inserted into channel ch0, the second frame (ch1, fr0) is inserted into channel ch1, the third frame (ch2, fr0) is inserted into channel ch2, the fourth frame (ch3, fr0) is inserted into channel ch3, the fifth frame (ch0, fr1) is inserted again into channel ch0, etc. Due to the frame numbering, frames with numbers fr0 and fr1 are alternating in each channel.

The receiver Rx receives the frames described above from parallel traffic channels ch0 to ch3 and restores the frames into the original order by using the channel and frame numbering transmitted in the frames. In other words, the receiver Rx selects frame (ch0, fr0) as the first frame from channel ch0, frame (ch1, fr0) as the second frame from channel ch1, etc. Thus due to channel and frame numbering according to the invention, the receiver Rx may identify the frames and their correct transmission order unambiguously. The frame numbering of the invention allows a relative transmission delay between parallel channels, which is at the maximum two frames in length, without losing the order of the frames in the receiver Rx. This is sufficient for most applications. The allowed delay offset can be extended, when needed, by increasing frame numbering. The receiver extracts the actual data bits from the frames restored in the correct order, 48 bits from each frame and combines the data bits into the original high-speed signal.

In the following, a few examples are given of how the status bits of the V.110 frame can be selected for the channel and frame numbering of the invention.

For example, bits S1, S4 and S6 may be used for channel numbering and frame numbering will not be used at all. In another case bits S1, S4 and S6 may be used for channel numbering (8 channels) and one of the X bits for 1-bit frame numbering within the channel. Further, status bits S4 and S6 may be used for channel numbering and one of the X bits and bit S3 for 2-bit frame numbering within the channel. There are also many other possibilities to use redundant bits for channel and frame numbering. The actual bit rate of each status bit has to be taken into consideration when selecting the bits. For example, if three of bits S1, S3, S6 and S8 are used for channel and/or frame numbering, the rate of the CT107 and CT108 status signals falls to a fourth of the original rate in one channel. If only two parallel channels are used then, the total CT107 and CT108 rate is half of the original rate and it will have an effect on the filtering of status signals in the reception. In the examples above the replication of the CT107 and CT108 bits is accomplished in several traffic channels (from two channels onwards) and therefore the fact that each frame of the parallel traffic channels has a smaller number of replicated status bits will have no effect on the bit error ratio of these status bits.

The figures and the description related thereto are only meant to illustrate the present invention. In its details the invention may vary within the spirit and scope of the appended claims.

What is claimed is:

1. A method for high-speed data transmission in a digital mobile communication system in which method data is transmitted over the radio path between a mobile station and a fixed mobile communication network in a traffic channel allocated to the mobile station, the method comprising:

allocating a high-speed data signal at least two parallel traffic channels having mutually different channel numbers assigned for the duration of a connection, when a data transmission rate required by the data signal exceeds a maximum transmission rate of one traffic channel;

inserting the data from the high-speed data signal into frames at the transmission end, each frame being provided with a channel number indicating the parallel traffic channel used for the transmission;

dividing the frames into parallel traffic channels in a sequential order according to channel numbering and transmitting them to the reception end; and reassembling the data in the frames into a high-speed data signal in the sequential order indicated by the channel numbers in the frames at the reception end.

2. A method according to claim 1, further comprising:

using frame numbering inside each of the traffic channels so that at least two successive frames always have a different frame number, whereby the maximum delay offset between the traffic channels increases in proportion to the number of the frame numbers as compared with the absence of the frame numbering; and reassembling the data in the frames into a high-speed data signal in the sequential order indicated by the channel and frame numbers in the frames at the reception end.

3. A method according to claim 1 or 2, further comprising:

transmitting frames in accordance with CCITT recommendation V.110 in the parallel traffic channels; and carrying the channel numbering and the potential frame numbering in redundant status bits of the V.110 frames.

4. A method according to claim 3, comprising:

using one or more of status bits S1, S4 and S6 for the channel numbering of the parallel traffic channels.

5. A method according to claim 4, further comprising using one of the X status bits for the frame numbering within each of the traffic channels.

6. A method according to claim 4, further comprising using S3 status bit and one of the X status bits for the frame numbering within each of the traffic channels.

7. A digital mobile communication system in which a mobile station and a fixed mobile communication network each comprise a data transmitter and a data receiver having a capability for a data transmission over the radio path on the traffic channel allocated to the mobile station, wherein:

the fixed mobile communication network is arranged to allocate to a high-speed data signal two or more parallel traffic channels having mutually different channel numbers during the connection, when the transmission rate required by the data signal is higher than the maximum transmission date of one traffic channel;

the data transmitters are arranged to insert the data from the high-speed data signal into frames, each frame being provided with a channel number indicating the parallel traffic channel used for the transmission, and to divide the frames into the parallel traffic channels in the sequential order according to channel numbering; and the data receivers are arranged to reassemble the data in the frames into a high-speed data signal in the sequential order indicated by the channel numbers in the frames.

8. A mobile communication system according to claim 7, wherein the data transmitters are further arranged to provide the frames with frame numbering within the traffic channel so that at least two successive frames always have a different frame number, and the data receivers are arranged to reassemble the date in the frames into a high-speed data signal in the sequential order indicated by the channel and frame numbers in the frames.

9. A mobile communication system according to claim 7 or 8, wherein the frames transmitted in the parallel traffic channels are frames in accordance with CCITT recommendation V.110, the channel numbering and the potential frame numbering of the frames being carried in redundant status bits of the V.110 frames.

* * * * *